United States Patent [19]
Maruyama et al.

[11] Patent Number: 5,602,241
[45] Date of Patent: Feb. 11, 1997

[54] METHOD FOR PURIFYING POLYSACCHARIDES

[75] Inventors: Kazumasa Maruyama; Kazuyuki Yamamoto; Shigehiro Nagura; Taira Homma, all of Nigata, Japan

[73] Assignees: Shin-Etsu Chemical Co., Ltd., Tokyo, Japan; Shin-Etsu Bio, Inc., San Diego, Calif.

[21] Appl. No.: 403,450

[22] Filed: Mar. 14, 1995

[51] Int. Cl.⁶ .............................. C07G 17/00; C07H 1/06
[52] U.S. Cl. ............................ 536/127; 536/124; 536/128
[58] Field of Search ..................... 536/127, 124, 536/128

[56] References Cited

U.S. PATENT DOCUMENTS

| | | | |
|---|---|---|---|
| 3,834,296 | 9/1974 | Kehse et al. | 536/127 |
| 4,831,127 | 5/1989 | Weibel | 536/128 |
| 4,833,237 | 5/1989 | Kawamura et al. | 536/124 |
| 4,895,938 | 1/1990 | Teraoka et al. | 536/128 |
| 4,944,946 | 7/1990 | Liu | 536/128 |
| 4,983,731 | 1/1991 | Wagner et al. | 536/127 |
| 5,315,003 | 5/1994 | Maruyama et al. | 536/127 |

FOREIGN PATENT DOCUMENTS 58-129984  8/1983  Japan .

OTHER PUBLICATIONS

Webster, 9th New Collegiate Dict, 1990, pp. 764 and 1199.

*Primary Examiner*—Ralph Gitomer
*Assistant Examiner*—Louise Leary
*Attorney, Agent, or Firm*—McAulay Fisher Nissen Goldberg & Kiel, LLP

[57] ABSTRACT

A method for continuously precipitating a polysaccharide dissolved in an aqueous solution wherein a non-solvent for the polysaccharide is admixed with the aqueous solution to cause the polysaccharide to precipitate from the solution. The method includes the step of simultaneously feeding the aqueous solution containing the dissolved polysaccharide and the non-solvent through respective constant flow rate-pumps to produce non-pulsating metered first and second streams which are unaffected by pressure changes in the aqueous solution or the non-solvent fed to the respective pumps. The metered streams are simultaneously introduced from the respective pumps into a rotary turbine to mix the solution and the non-solvent and precipitate the polysaccharide. The precipitated polysaccharide is cut with an interlocking cutter which comprises a fixed cutter and a rotary cutter, and a suspension of finely cut polysaccharide particles is continuously withdrawn.

20 Claims, 3 Drawing Sheets

METHOD FOR PURIFYING POLYSACCHARIDES

BACKGROUND OF THE INVENTION

This invention relates to a method for purifying polysaccharides present in the form of an aqueous solution.

A known method for purifying polymers present as solutes in solutions include the step of precipitating the polymers through the addition of auxiliary solvents which are miscible with the solvent components of the polymer solutions but in which the polymers are insoluble. This method has been used in the purification of xanthan gum which is a polysaccharide obtained through fermentation by a microorganism. See for example, U.S. Pat. No. 5,340,743. According to this method, the xanthan gum is precipitated and separated by admixing the culture medium containing xanthan gum with isopropanol as a hydrophilic solvent. This method, may however, require a large amount of isopropanol, making it difficult to recover the isopropanol after the precipitation and separation of the xanthan gum. In addition, the equipment and facilities for carrying out the process are expensive. Moreover, the xanthan gum is precipitated in the form of strings and if a stirring machine is used, it is difficult to perform the purification operation since the xanthan gum coils around the stirring machine.

A method which obviates the above-described difficulties is described and claimed in U.S. Pat. No. 5,315,003, the contents of which are incorporated herein by reference. An aqueous solution Of a polysaccharide and a hydrophilic organic solvent which does not solubilize the polysaccharide are continuously and simultaneously admixed in a rotary turbine to precipitate the polysaccharide. The precipitated polysaccharide is continuously cut with an interlocking cutter comprising a fixed cutter element and a rotary cutter element. A suspension of finely cut polysaccharide particles is continuously produced at the end of the process.

In the apparatus for implementing this continuous polysaccharide precipitation and cutting process, the rotary cutter is driven by the same shaft as the precipitation turbine. The streams of the aqueous polysaccharide solution and the hydrophilic organic solvent are fed by pumps such as rotary pumps or diaphragm pumps to the turbine. With this apparatus, a problem arises in quality control. The polysaccharide particles can have greatly varying sizes, depending on the relative flow rates of the aqueous polysaccharide solution and the hydrophilic organic solvent fed to the turbine.

OBJECTS OF THE INVENTION

An object of the present invention is to provide an improved method for the continuous production of precipitated polysaccharide from an aqueous solution thereof.

Another object of the present invention is to provide a method utilizing a turbine cutter as described above, where the polysaccharide particle size has a smaller range.

Another, more particular, object of the present invention is to provide such a method wherein the polysaccharide particle size is less dependent on variations in pressures of the aqueous polysaccharide solution and the hydrophilic organic solvent.

These and other objects of the present invention will be apparent from the drawings and detailed descriptions herein.

SUMMARY OF THE INVENTION

The present invention is directed to an improvement in the above-described method for continuously precipitating a polysaccharide dissolved in an aqueous solution wherein a non-solvent for the polysaccharide is admixed with the aqueous solution to cause the polysaccharide to precipitate from the solution. Pursuant to the present invention, the method includes the step of simultaneously feeding the aqueous solution containing the dissolved polysaccharide and the non-solvent through respective constant flow rate-pumps to produce non-pulsating metered first and second streams which are unaffected by pressure changes in the aqueous solution or the non-solvent fed to the respective pumps. The metered streams are simultaneously introduced from the respective pumps into a rotary turbine to mix the solution and the non-solvent and precipitate the polysaccharide. The precipitated polysaccharide is cut with an interlocking cutter which comprises a fixed cutter and a rotary cutter, and a suspension of finely cut polysaccharide particles is continuously withdrawls.

The purification method of the instant invention can be applied to any polysaccharides which are soluble in water. Applicable polysaccharides include those derived from plants, seaweeds and animals or obtained through fermentation by microorganisms. More specifically, polysaccharides recoverable in accordance with the present invention include guar gum, locust bean gum, tamarind gum, tara gum, gum arabic, tragacanth gum, pectin, carrageenan, alginate, chitosan, dextran, xanthan gum, gellan gum, welan gum, rhamsan gum, pullulan, curdlan, schizophyllan, scleroglucan, levan, acetan, elsinan, mutan, succinoglycan, nigeran, and hyaluronic acid.

The non-solvent is a member of the group consisting of alcohols, ethers, dioxane, acetone, and tetrahyrofuran. The preferred hydrophilic solvent is isopropyl alcohol. However, methyl alcohol or ethyl alcohol may be used.

The concentration of the aqueous solution of the polysaccharide ranges from about 0.5% to about 20% by weight. If the concentration is higher than 20% by weight, the polysaccharide precipitated is not cut into fine particles. If the concentration is lower than 0.5% by weight, the loss in the recovery of the polysaccharides is substantial.

The mixing ratio of the aqueous solution of the polysaccharide to the hydrophilic organic solvent which does not solubilize the polysaccharide preferably ranges from about 1:0.8 to about 1:5 (volume/volume). If the mixing ratio is less than about 1:0.8, the polysaccharide is not finely precipitated and cannot be recovered. If the mixing ratio is greater than about 1:5, the quantity of the aqueous solution becomes superfluous.

Preferably, the non-solvent is supplied in the form of a mixture with water.

According to a feature of the present invention, each of the constant flow rate pumps is a Mohno type pump.

DETAILED DESCRIPTION

Figure 1:
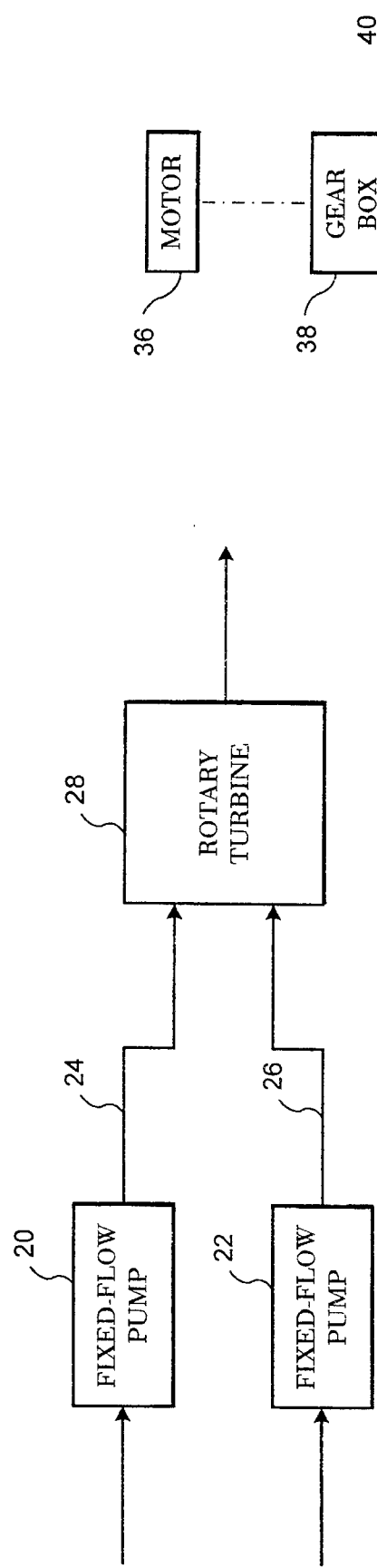
FIG. 1 is a block diagram of a continuous precipitation system utilizable to implement a method in accordance with the present invention.

FIG. 1 illustrates a continuous flow system for continuously precipitating a polysaccharide dissolved in an aqueous solution wherein a fluidic non-solvent for the polysaccharide is admixed with the aqueous solution to cause the polysaccharide to precipitate from the solution. The aqueous solution containing the dissolved polysaccharide is fed to a first constant flow rate pump 20 while the fluidic non-solvent is simultaneously fed to a second constant flow rate- pump 22 to produce non-pulsating metered first and second streams 24 and 26 which are unaffected by pressure changes in the aqueous solution or the non-solvent fed to the respective pumps. Metered streams 24 and 26 are simultaneously introduced from pumps 20 and 22 into a rotary turbine 28 to mix the aqueous solution and the fluidic non-solvent and precipitate the polysaccharide. In rotary turbine 28, the precipitated polysaccharide is masticated with an interlocking cutter 30 (see FIG. 3) which comprises a fixed cutter element 111 and a rotary cutter element 109. A suspension of finely cut polysaccharide particles is continuously withdrawn from the rotary cutter 28.

Figure 2:
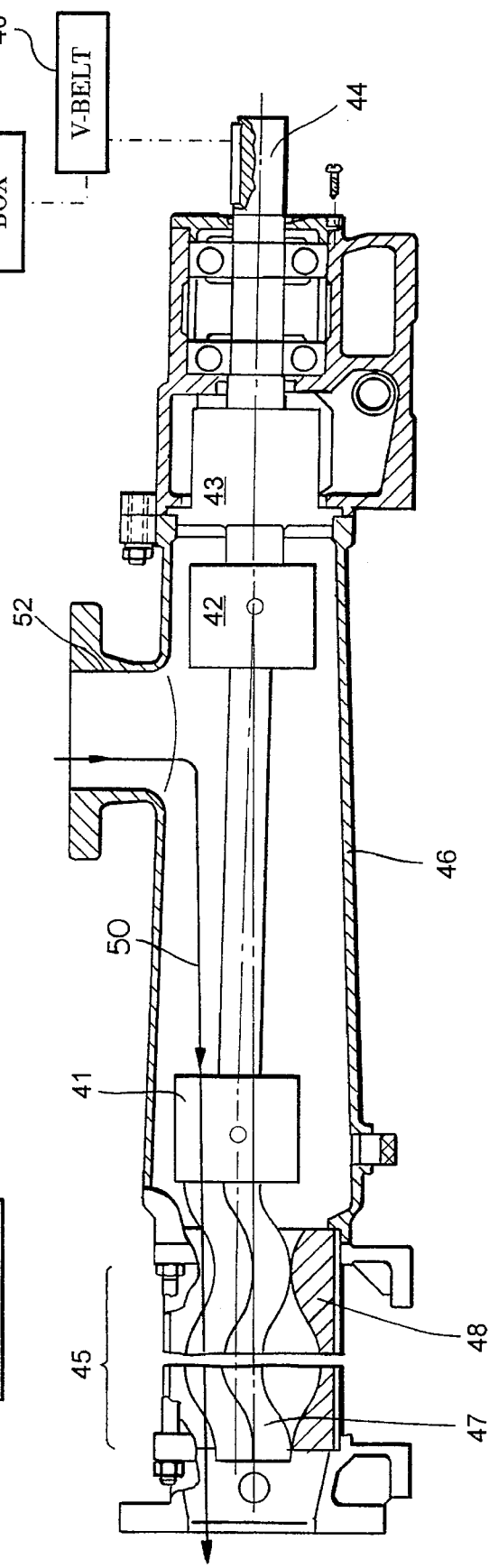
FIG. 2 is a section al diagram of a Mohno pump utilizable in the system of FIG. 1.

As illustrated in FIG. 2, each pump 20 and 22 may take the form of a Mohno type pump comprising a shaft 44 driving a rotor 47 and in turn driven by a motor 36 via a gear box 38 and a V-belt 40. Rotor 47 is disposed inside a stator 48 which has a casing 45 connected to a shaft casing 46. A mechanical seal 43 seals liquid inside shaft casing 46. Because rotor 47 is connected to shaft 44 via a pair of flexible couplings 41 and 42, the rotor can rotate in an elliptic way in stator casing 45 and transfer incoming liquid forward, as indicated by an arrow 50. The structure of FIG. 2 provides a non-pulsating metered flow that is virtually unaffected by changes in the pressure of the liquid at an intake 52 of the pump. Where pumps 20 and 22 are implemented by respective Mohno type constant flow rate pumps, operating the pumps produces metered streams 24 and 26 of the aqueous solution containing the polysaccharide and of the fluidic non-solvent composition, respectively. Streams 24 and 26 have respective flow rates which are essentially independent of pressure changes in the aqueous polysaccharide solution and the fluidic non-solvent composition. This results in a substantially more uniform production of finely cut precipitated polysaccharide at an output (not designated) of rotary turbine 28.

A Mohno type pump utilizable in the system of FIG. 1 is manufactured by Heishin Engineering and Equipment Co., Ltd. in Japan under the model name Heishin Mohno Pump 2NE40PA.

Where the Mohno pump of FIG. 2 was used in the system of FIG. 1 as pumps 20 and 22, xanthan gum was recovered from an aqueous solution including 3% xanthan gum by mixing with 85% isopropanol. The aqueous xanthan gum solution and the isopropanol were simultaneously supplied to rotary turbine precipitator 28 at set flow rates of 1000 L/hr and 1500 L/hr, respectively. After precipitation of xanthan gum by rotary turbine 28, a slurry was obtained which contained xanthan gum fibers all less than 10 cm in length and no unprecipitated broth or solution. The precipitation process was successfully carried on continuously and the ratio of the isopropanol to the aqueous xanthan gum solution or broth was not changed.

Figure 3:
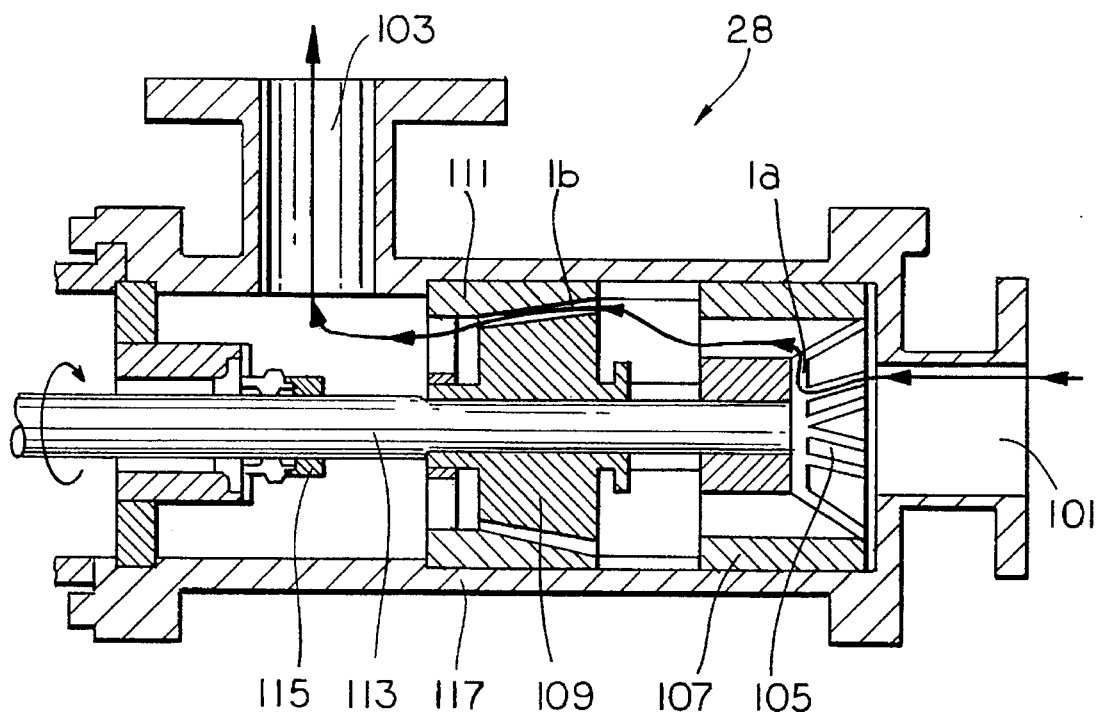
FIG. 3 is a sectional view of a rotary turbine precipitator shown in FIG. 1.

FIG. 3 is a cross sectional view of an embodiment of rotary turbine or pump mill 28 which is used in practicing the method for purifying a polysaccharide according to the present invention Rotary turbine comprises a driving portion, a mixing portion and a cutting portion. The driving portion (not shown) consists of a motor which is connected to a turbine shaft 113 positioned outside a cylindrical casing 117 and is isolated from the interior of cylindrical casing 117 through a mechanical seal 115. The mixing portion and the cutting portion are positioned within the cylindrical casing 117. Cylindrical casing 117 is equipped with an intake port 101 and a discharge port 103 and the casing is provided with turbine shaft 113 at the central portion thereof. The mixing portion comprises a rotary turbine, 105 fitted to turbine shaft 113 in the vicinity of intake port 101 and a stator 107 positioned at a portion corresponding to rotary turbine 105. The cutting portion comprises an interlocking cutter which is composed of a rotary cutter 109 fitted to turbine shaft 113 between the mixing portion and discharge port 103 and fixed cutter 111 positioned adjacent to rotary cutter 109 so as to surround the rotary cutter. Rotary turbine 105 and rotary cutter 109 have spiral shapes which are tilted with respect to the axis of turbine shaft 113 so as to have a transporting ability upon the rotation of turbine shaft 113.

Spaces 1a and 1b exist between rotary turbine 105 and stator 107 and between rotary cutter and fixed cutter 111, respectively. The magnitude of these spaces in general range from 0.1 to 5 mm and preferably in the order of about 1 mm. If the space is greater than 5 mm, sufficient mixing of these two liquids are not ensured and insufficient amount of polysaccharides are precipitated. Moreover, the polysaccharides precipitated are not finely cut in the cutting portion.

A flow path is formed by interstices of each part and/or between parts within rotary turbine 28 and the liquids pass through the flow path along with a line indicated by an arrow from intake port 101 to discharge port 103.

As to the function of rotary turbine 28, turbine shaft 113 rotates in the direction indicated by an arrow when the motor in the driving portion which in turn rotates rotary turbine 105 and rotary cutter 109. It is sufficient to set the number of revolution at a level of 1000 rpm or higher. If a solution of a polysaccharide and a hydrophilic organic solvent which does not solubilize the polysaccharide are simultaneously supplied to rotary turbine 28 through intake port 101, these two kinds of liquids are admixed by the action of rotary turbine 105. The mixed liquid is further mixed since it is compressed when it passes through space and as a result, the polysaccharide is precipitated. The polysaccharide precipitated at this stage is in the form of a string, but it is transferred to space 1b of the cutting portion through space 1a together with the liquid and cut into fine particles by the interlocking cutter comprising rotary cutter 109 and fixed cutter 111 within the cutting portion. The particulate polysaccharides formed at space b are in the form of a mixture with the liquid and, therefore, they are discharged through discharge port 103 in the form of a suspension. Rotary turbine 28 has an ability to suck and discharge the mixed liquid and these particulate polysaccharides and thus they are continuously transported from intake port 101 to discharge port 103 without causing any retention.→

Figure 4:
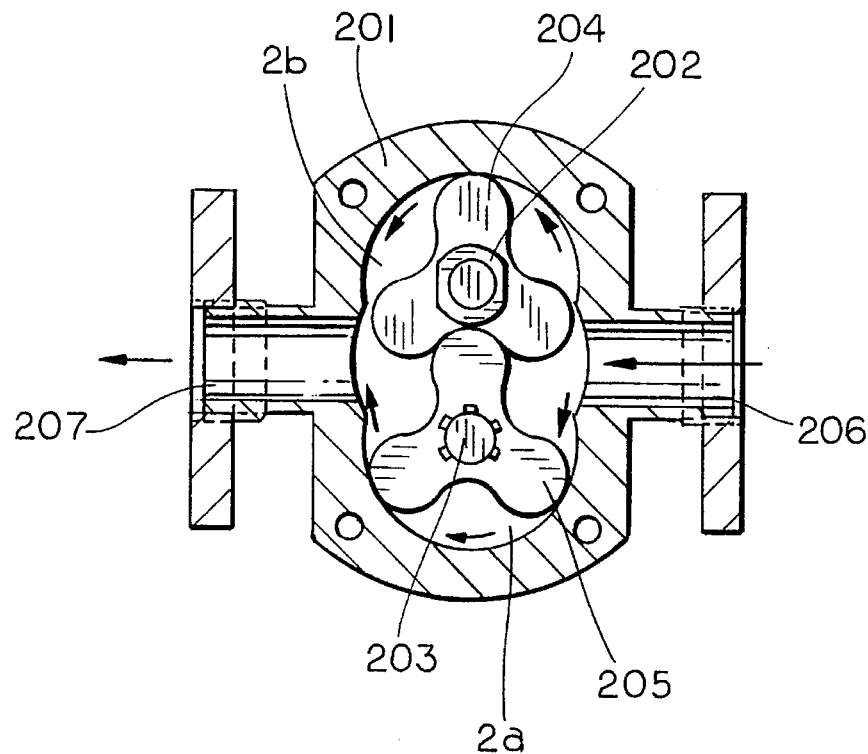
FIG. 4 is a cross-sectional view of a rotary pump used in the system of FIG. 1 for purposes of providing comparative data.

As shown in FIG. 4, a rotary pump used in the system of FIG. 1 to provide comparative data comprises a pair of rotators 204 and 205 connected to respective turbine shafts 202 and 203. During rotation of rotors 204 and 205, liquid is transferred from a suction opening 206 to a discharge opening 207 through gaps 2a and 2b between the rotors and a pump casing 201.

Where a rotary pump as illustrated in FIG. 4 was used in the system of FIG. 1 as pumps 20 and 22, xanthan gum was recovered from an aqueous solution including 3% xanthan gum by mixing with 85% isopropanol. The aqueous xanthan gum solution and the isopropanol were simultaneously supplied to rotary turbine precipitator 28 at set flow rates of 1000 L/hr and 1500 L/hr, respectively. It was found that the flow rates of the high viscosity broth including xanthan gum and the low viscosity isopropanol varied during operation of the system, and it was difficult to keep the ratio of the flow rates of the xanthan gum broth and the isopropanol steady. Consequently, the precipitation result varied. Too great a flow rate of the xanthan gum broth led to non-precipitated gel, while too great a flow rate of the isopropanol resulted in a larger xanthan fiber size.

Figure 5:
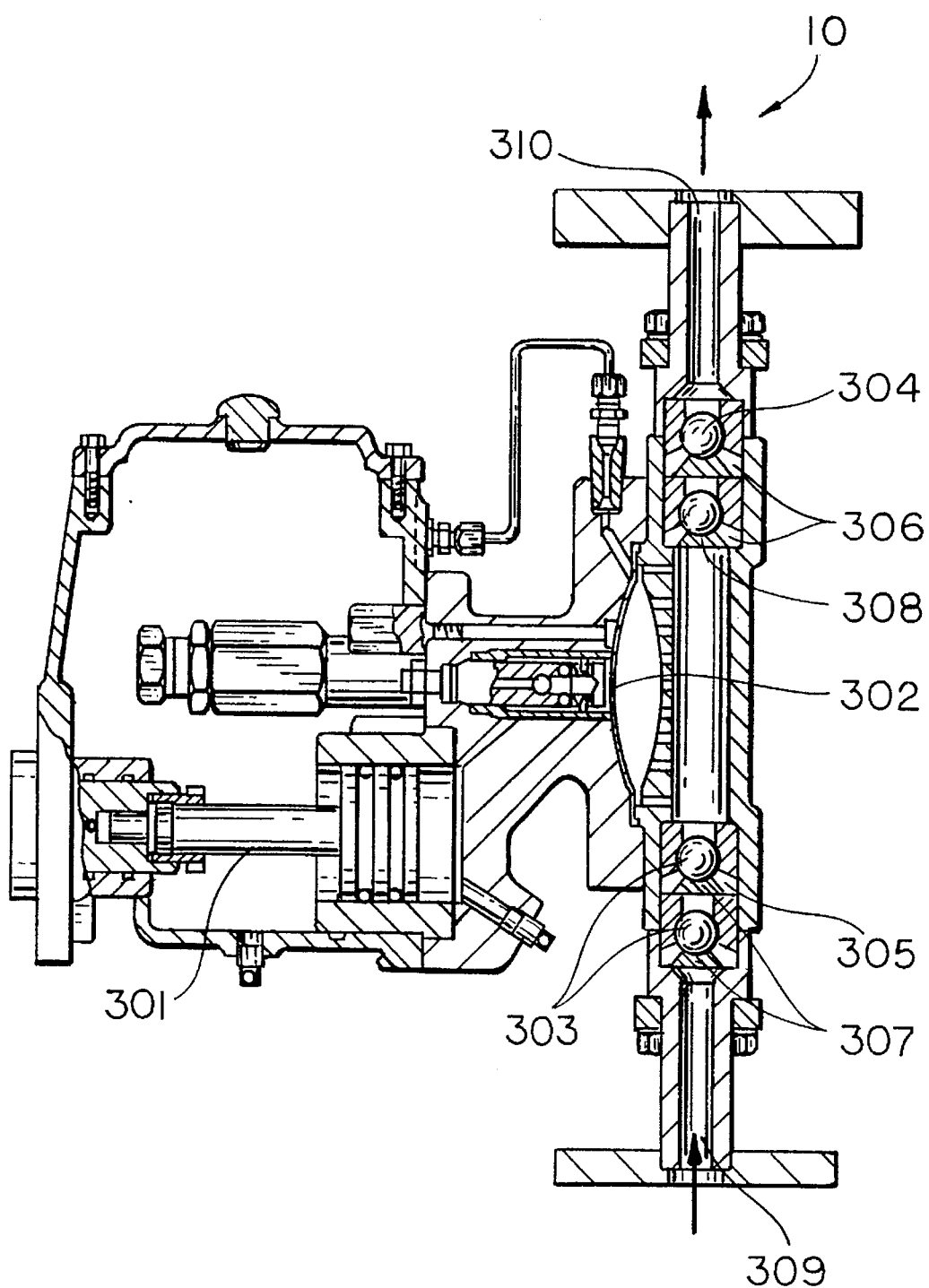
FIG. 5 is a cross-sectional view of a diaphragm pump used in the system of FIG. 1 for purposes of providing comparative data.

As depicted in FIG. 5, a diaphragm type pump used in the system of FIG. 1 to provide comparative data comprises a diaphragm 302 connected to an oil piston press 301. Ganged inlet valves 303 and ganged outlet valves 304 are provided respectively upstream and downstream of the diaphragm 302. Valves 303 and 304 are provided with valve sheets 305 and 306, respectively, and with gaskets 307 and 308, respectively. During a pumping cycle of diaphragm 302, liquid is transferred from suction opening 309 in through inlet valves 303 and to discharge opening 310 through outlet valves 304.

Where a diaphragm pump as shown in FIG. 5 was used in the system of FIG. 1 as pumps 20 and 22, xanthan gum was recovered from an aqueous solution including 3% xanthan gum by mixing with 85% isopropanol. The aqueous xanthan gum solution and the isopropanol were simultaneously supplied to rotary turbine precipitator 28 at set flow rates of 1000 L/hr and 1500 L/hr, respectively. It was found that the ratio of the flow rates of the high viscosity broth including xanthan gum and the low viscosity isopropanol varied, leading to a variation in the precipitation result. Precipitates of fine fibrous materials could not be recovered on a continuous basis.

In the examples described above, the viscosity of the xanthan gum broth was 10,000–15,000 cP (Brook-field viscometer at 30 rpm), while the viscosity of the isopropanol was 1–2 Cst (Ubbelohde viscometer, the coefficient 0.003 cSt/sec). Where the pump of FIG. 2 was used in the system of FIG. 1, the flow rate of xanthan gum broth pump 20 varied between 950 and 1,050 L/hr, while the flow rate of the isopropanol varied between 1,450 and 1,600 L/hr. In contrast, where the rotary pump of FIG. 4 was used in the system of FIG. 1, the bow rate of the broth varied between 700 and 1,300 L/hr, while the flow rate of the isopropanol varied between 1,200 and 1,900 L/hr. The flow rates when using the diaphragm pump of FIG. 5 also varied widely: between 500 and 1,200 L/hr for the xanthan gum broth and between 1,000 and 2,000 L/hr for the isopropanol.

Although the invent ion has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. In a method for continuously precipitating a polysaccharide dissolved in an aqueous solution wherein a hydrophilic organic solvent for the polysaccharide is admixed with the aqueous solution to cause the polysaccharide to precipitate from the solution, the improvement which comprises:

simultaneously feeding the aqueous solution containing the dissolved polysaccharide and the hydrophilic organic solvent, respectively through separate constant flow rate-pumps to produce non-pulsating metered first and second streams of each of the solution and the hydrophilic organic solvent, respectively, which streams are unaffected by pressure changes in the aqueous solution or the hydrophilic organic solvent fed to the respective pumps;

introducing the first and second streams from each of the respective pumps, simultaneously, into a rotary turbine to mix the solution and the hydrophilic organic solvent and precipitate the polysaccharide; and cutting the precipitated polysaccharide with an interlocking cutter which comprises a fixed cutter and a rotary cutter, and continuously withdrawing a suspension of finely cut polysaccharide particles.

2. The method of claim 1 wherein the polysaccharide is a member selected from the group consisting of those derived from plants, seaweeds and animals or obtained through fermentation by microorganisms.

3. The method of claim 2 wherein the polysaccharide is a member selected from the group consisting of guar gum, locust bean gum, tamarind gum, tara gum, gum arabic, tragacanth gum, pectin, carrageenan, alginate, chitosan, dextran, xanthan gum, gellan gum, welan gum, rhamsan gum, pullulan, curdlan, schizophyllan, scleroglucan, levan, acetan, elsinan, mutan, succinoglycan, nigeran, and hyaluronic acid.

4. The method of claim 1 wherein the hydrophilic organic solvent is a member of the group consisting of alcohols, ethers, dioxane, acetone, and tetrahyrofuran.

5. The method of claim 4 wherein the hydrophilic organic solvent is a member of the group consisting of isopropyl alcohol, methyl alcohol, ethyl alcohol, dioxane, acetone, and tetrahyrofuran.

6. The method of claim 1 wherein the aqueous solution of the polysaccharide is a culture medium containing xanthan gum.

7. The method of claim 1 wherein the concentration of the aqueous solution of the polysaccharide ranges from about 0.5% to about 20% by weight.

8. The method of claim 1 wherein the volume ratio of the aqueous solution of the polysaccharide to the hydrophilic organic solvent ranges from about 1:0.8 to about 1:5.

9. The method of claim 1 wherein the hydrophilic organic solvent is supplied in the form of a mixture with water.

10. The method of claim 1 wherein each of said constant flow rate-pump is a Mohno pump.

11. A method for preparing a polysaccharide, comprising the steps of:

feeding, to a first constant flow rate-pump, an aqueous solution containing a dissolved polysaccharide;

simultaneously delivering, to a second constant flow rate-pump, a hydrophilic organic solvent in which the polysaccharide is insoluble for causing the polysaccharide to precipitate from solution;

operating said first constant flow rate-pump and said second constant flow rate pump to produce metered first and second streams of the aqueous solution and the hydrophilic organic solvent, said first and second streams having respective flow rates which are essentially independent of pressure changes in the aqueous solution and the hydrophilic organic solvent, respectively;

introducing said first and second streams simultaneously into a rotary turbine to mix the aqueous solution and the hydrophilic organic solvent and precipitate the polysaccharide; and cutting the precipitated polysaccharide with an interlocking cutter which comprises a fixed cutter and a rotary cutter, and continuously withdrawing a suspension of finely cut polysaccharide particles.

12. The method of claim 11 wherein the polysaccharide is a member selected from the group consisting of those derived from plants, seaweeds and animals or obtained through fermentation by microorganisms.

13. The method of claim 12 wherein the polysaccharide is a member selected from the group consisting of guar gum, locust bean gum, tamarind gum, tara gum, gum arabic, tragacanth gum, pectin, carrageenan, alginate, chitosan, dextran, xanthan gum, gellan gum, welan gum, rhamsan gum, pullulan, curdlan, schizophyllan, scleroglucan, levan, acetan, elsinan, mutan, succinoglycan, nigeran, and hyaluronic acid.

14. The method of claim 11 wherein the hydrophilic organic solvent is a member of the group consisting of alcohols, ethers, dioxane, acetone, and tetrahyrofuran.

15. The method of claim 14 wherein the hydrophilic organic solvent is a member of the group consisting of isopropyl alcohol, methyl alcohol, ethyl alcohol, dioxane, acetone, and tetrahyrofuran.

16. The method of claim 11 wherein the aqueous solution of the polysaccharide is a culture medium containing xanthan gum.

17. The method of claim 11 wherein the concentration of the aqueous solution of the polysaccharide ranges from about 0.5% to about 20% by weight.

18. The method of claim 11 wherein the volume ratio of the aqueous solution of the polysaccharide to the hydrophilic organic solvent ranges from about 1:0.8 to about 1:5.

19. The method of claim 11 wherein the hydrophilic organic solvent is supplied in the form of a mixture with water.

20. The method of claim 11 wherein each of said constant flow rate pumps is a Mohno pump.

* * * * *